US005530596A

United States Patent [19]
Fukino et al.

[11] Patent Number: 5,530,596
[45] Date of Patent: Jun. 25, 1996

[54] LENS BARREL FOR AN AUTOMATIC FOCUSING SYSTEM

[75] Inventors: Kunihiro Fukino, Fujisawa; Tsuneo Watanabe, Tokyo, both of Japan

[73] Assignee: Nikon Corporation, Tokyo, Japan

[21] Appl. No.: 219,532

[22] Filed: Mar. 29, 1994

[30]  Foreign Application Priority Data

Mar. 31, 1993  [JP]  Japan .................. 5-073775

[51] Int. Cl.⁶ .................................. G02B 15/14
[52] U.S. Cl. .................. 359/694; 354/195.12; 359/700
[58] Field of Search ...................... 359/694, 699, 359/700, 701, 703, 704; 354/195.12

[56]  References Cited

U.S. PATENT DOCUMENTS 4,484,800  11/1984  Tamura ...................... 350/429
5,262,898  11/1993  Nomura ...................... 359/700
5,329,329   7/1994  Fukushima ................. 359/694
5,392,160   2/1995  Satoh ........................ 359/699

*Primary Examiner*—David C. Nelms
*Assistant Examiner*—Son Mai
*Attorney, Agent, or Firm*—Oliff & Berridge

[57]  ABSTRACT

The lens barrel according to the present invention is provided with a rotating cylinder that rotates around the optical axis of a photographing lens, a lens holding member that holds a photographing lens and travels in the direction of the optical axis by interlocking with the rotation of the rotating cylinder, a traveling member that travels in the same direction as the lens holding member by interlocking with the rotation of the rotating cylinder, and a force applying mechanism provided between the traveling member and the lens holding member which applies force to the lens holding member in the direction of the optical axis in order to eliminate play in the direction of the optical axis between the lens holding member and the rotating cylinder.

18 Claims, 6 Drawing Sheets

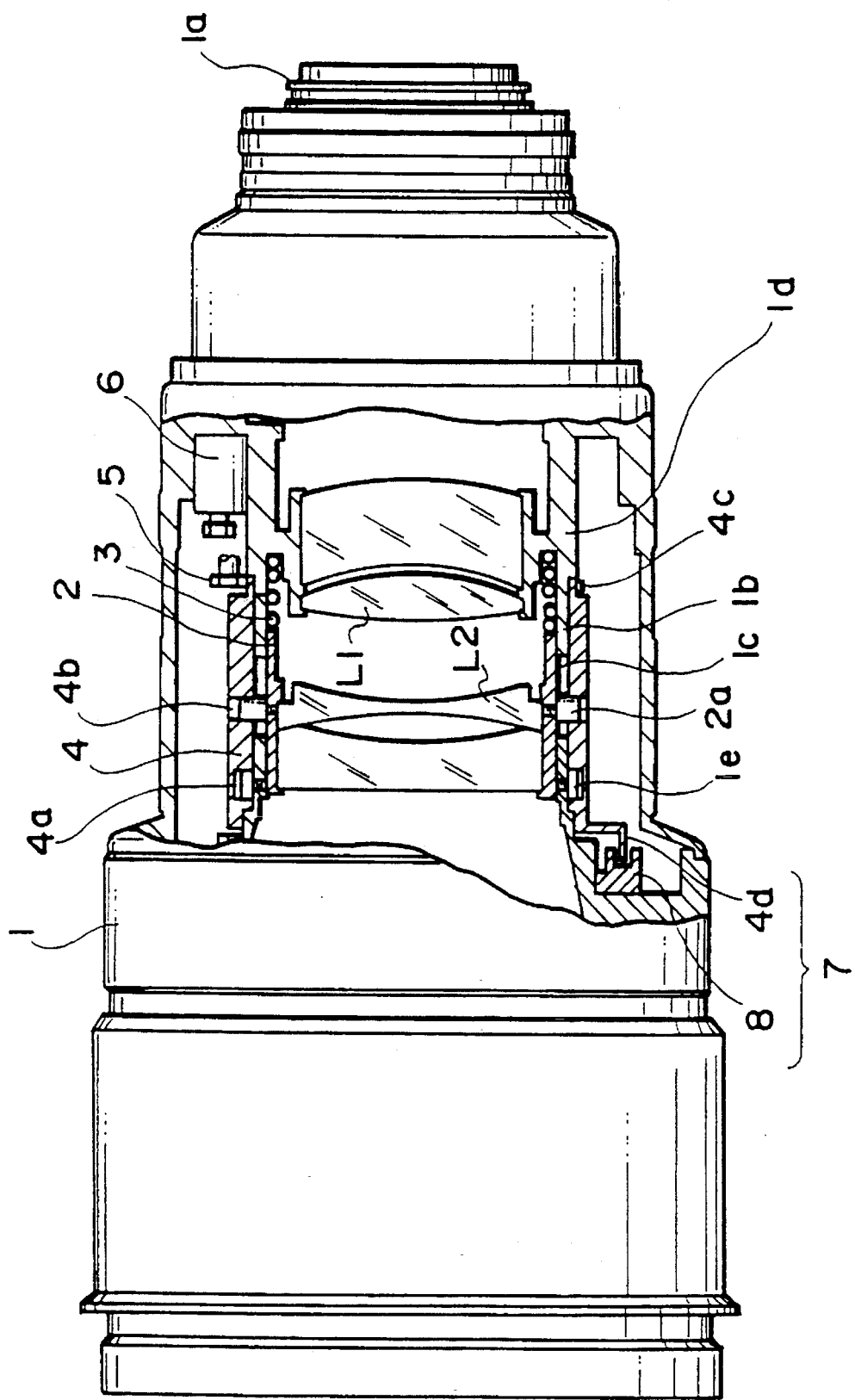

LENS BARREL FOR AN AUTOMATIC FOCUSING SYSTEM

BACKGROUND OF THE INVENTION

1. Field of the Invention

The present invention relates to a lens barrel that performs focusing or zooming by moving a lens holding member in the direction of the optical axis with this move being interlocked with the rotation of a rotating cylinder.

2. Description of the Related Art

There is, in the known art, an automatic focusing system in which a focal point detection signal obtained by a focal point detection device within the camera body is communicated to a CPU that is provided inside the lens barrel and the CPU electrically drives the focusing optical system so that a specific focus state can be achieved. FIG. 8 shows an example of the prior art of lens barrel used in this type of automatic focusing system.

In FIG. 8, a numeral 1 indicates a fixed lens barrel that is provided with the mounting section 1a for mounting the lens barrel onto the camera body. On the circumferential surface of the small diameter section 1b of the fixed lens barrel, a guide groove 1c is provided, running in the direction of the optical axis, and the lens holding portion 1d for holding the fixed lens group L1 is formed in the rear section of the inner circumferential surface of the fixed lens barrel 1. On the front portion of the inner circumferential surface of the small diameter section 1b, the lens holding cylinder 2 for holding the moving lens group L2 is fitted on in such a manner that it can travel in the direction of the optical axis and the spring 3 is provided between the lens holding cylinder 2 and the lens holding portion 1d of the small diameter section 1b. The spring 3 applies a constant force to the lens holding cylinder 2 in the forward direction along the optical axis of the lens group L2.

A numeral 4 indicates the cam cylinder that is externally fitted on to the tip of the small diameter section 1b in such a manner that it can rotate and on the inner circumferential surface of the cam cylinder 4, a fitting groove 4a and a cam groove 4b are formed in the direction of the circumference. A plurality of pins 1e protrude from the tip of the small diameter section 1b are inserted into the fitting groove 4a and with this, the cam cylinder 4 rotates while its movement in the direction of the optical axis is prevented. The cam follower 2a which protrudes from the lens holding cylinder 2 is inserted into the cam groove 4b of the cam cylinder 4 by passing through the guide groove 1c of the small diameter section 1b.

A segment gear 4c is formed at the rear end on the external circumferential surface of the cam cylinder 4 and the pinion gear 5 which fits with the segment gear 4c is linked to the focusing motor 6 via a gear train (not shown). A numeral 7 indicates an encoder for lens travel distance detection which consists of the pattern section 4d formed as a part of the external circumferential surface of the cam cylinder 4 at the forward end of the cam cylinder 4 and the detection section 8 that detects the patterns of the pattern section 4d. With this encoder 7, the amount of rotation of the cam cylinder 4, that is, the travel distance of the lens is detected and the results of the detection are input to the CPU (not shown) within the lens barrel.

The lens barrel that is structured as described above is mounted on the camera body (not shown) via the mounting section 1a. When the release button of the camera body is pressed halfway down, the focal point detection signal which has been calculated in the focal point detection device of the camera body is input to the CPU within the lens barrel. The CPU supplies a drive signal to the focusing motor 6 in response to the input focal point detection signal and with this, the focusing operation is performed. The rotation of the focusing motor 6 is communicated to the cam cylinder 4 via a reduction gear train (not shown), the pinion gear 5 and the segment gear 4c to cause the cam cylinder 4 to rotate around the optical axis. With the rotation of the cam cylinder 4, the cam groove 4b moves and the cam follower 2a is driven along the guide groove 1c to cause the lens holding cylinder 2, that is, the moving lens group L2 to move, relative to the fixed lens group L1, in the direction of the optical axis. When the lens travel distance as detected by the encoder 7 reaches the calculated lens travel distance, the CPU stops the focusing motor 6.

The spring 3 which is provided between the lens holding cylinder 2 and the lens holding portion 1d eliminates the play between the cam cylinder 4 and the lens holding cylinder 2 in the direction of the optical axis. As described above, with the type of lens barrel in which the rotation of the cam cylinder 4 is detected by the encoder 7 to determine the lens travel distance, if there is any play between the cam cylinder 4 and the lens holding cylinder 2 in the direction of the optical axis, an discrepancy is generated between the actual lens travel distance and the output of the detection from the encoder 7 to lower the focusing accuracy. To deal with this problem, force is applied by the spring 3 to the lens holding cylinder 2 in the direction of the optical axis to press the cam follower 2a against the wall surface of the cam groove 4b. Consequently, the play between the cam cylinder 4 and the lens holding cylinder 2 is removed, improving the focusing accuracy.

In general, in order to improve the focusing accuracy in an automatic focusing system, it is necessary to move the focusing optical system to the correct position and then to stop it with great precision. To achieve this, it is desirable to minimize the elapsed time and distance of the lens holding cylinder 2 traveled from the time when the rotating focusing motor 6 is braked until the time when the lens holding cylinder 2 stops, and to make these constant. The lens stopping characteristics are determined by the moment of inertia of the mechanism, which consists of the focusing motor, the reduction gear train, the cam cylinder, the lens holding cylinder, the lens groups and so forth, as well as the friction torques among the various components of the above mechanism and the like. Therefore, in order to maintain stable and constant lens stopping characteristics, it is necessary to maintain the friction torques among the various components constant and stable.

However, in the structure of the lens barrel in the prior art, since the spring 3 is provided between the fixed lens barrel 1 and the lens holding cylinder 2, the amount of deflection of the spring 3, and, therefore, the force it applies, changes greatly depending upon the position of the lens holding cylinder 2. The force applied by the spring 3 works on the cam cylinder 4 via the cam follower 2a of the lens holding cylinder 2 and at the same time it works on the fixed lens barrel 1 via the cam cylinder 4. Therefore, if the force applied by the spring 3 changes, the friction torques generated on the various surfaces of the cam cylinder 4 and the fixed lens barrel 1 changes. As a result, the lens stopping characteristics change depending upon the position of the lens holding cylinder 2 and this lowers the focusing accuracy.

SUMMARY OF THE INVENTION

The objective of the present invention is to provide a lens barrel which is improved to ensure that the force applied by the force applying mechanism for removing play, as described above, does not change greatly depending upon the position of the lens.

In order to achieve this objective, the lens barrel according to the present invention is provided with a rotating cylinder that rotates around the optical axis of a photographing lens, a lens holding member that holds a photographing lens and is connected to the rotating cylinder so that it travels in the direction of the optical axis by interlocking with the rotation of the rotating cylinder, a traveling member that travels in the same direction as the lens holding cylinder by interlocking with the rotation of the rotating cylinder, and a force applying mechanism which is provided between the traveling member and the lens holding member and which applies force to the lens holding member in the direction of the optical axis in order to eliminate play between the lens holding member and the rotating cylinder in the direction of the optical axis.

Since the traveling member travels in the same direction as the lens holding member by interlocking with the rotation of the rotating cylinder, the force applied by the force applying mechanism, which is mounted between the lens holding member and the traveling member, does not change much even when the lens holding member moves. As a result, the stopping characteristics of the lens can be improved by reducing the changes in the friction torques among the various members and it also becomes possible to move the focusing optical system or the zooming optical system to a specific position with high precision.

BRIEF DESCRIPTION OF THE DRAWINGS

FIG. 8 is a cross section showing a lens barrel of the prior art;

DETAILED DESCRIPTION OF THE PREFERRED EMBODIMENTS

First Embodiment

Figure 1:
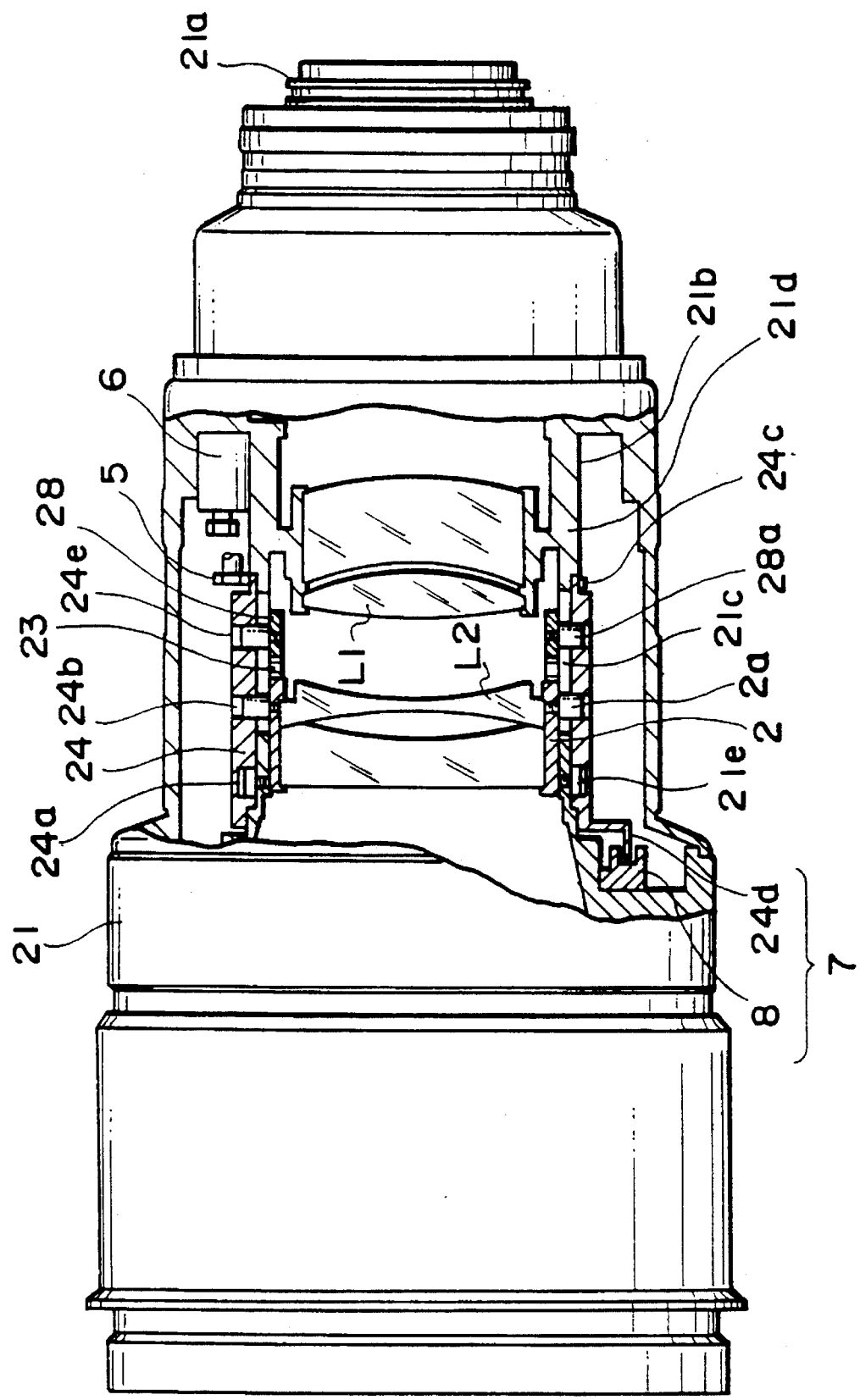
FIG. 1 is a cross section of the first embodiment of the lens barrel according to the present invention.
Figure 2:
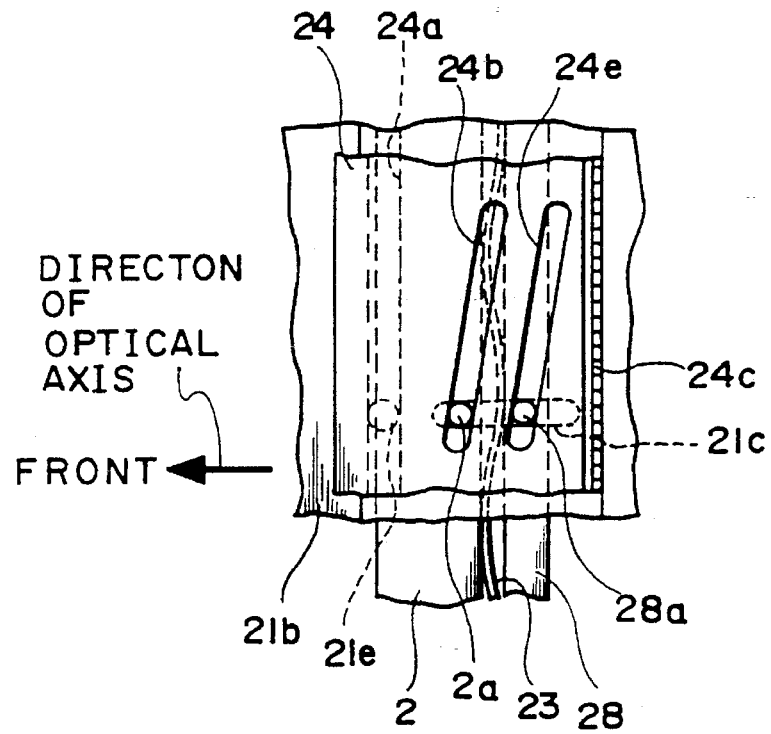
FIG. 2 is a cut-away elevation of the essential parts of FIG. 1.

The first embodiment of the present invention is explained in reference to FIGS. 1 and 2.

FIG. 1 is a cross section showing a lens barrel according to the present invention. Note that the same numeral are assigned to components identical to those shown in FIG. 8 and here, explanation will mainly be of the differences between this embodiment and that shown in FIG. 8.

In FIG. 1, the guide groove 21c that is provided in the small diameter section 21b of the fixed lens barrel 21 and which extends in the direction of the optical axis, is longer than the guide groove 1c shown in FIG. 8 and the two cam followers 2a, 28a, which are to be explained later, pass through the guide groove 21c. As shown in FIG. 2, the cam groove 24b is formed in the cam cylinder 24, which is externally fitted onto the small diameter section 21b, and at the same time, a cam groove 24e is formed parallel to and at a specific distance behind the cam groove 24b with exactly the same shape as the cam groove 24b. The lens holding cylinder 2 that holds the moving lens group L2 is fitted onto the internal circumferential surface of the small diameter section 21b, as in the lens barrel shown in FIG. 8, and to the rear of the lens holding cylinder 2, the moving ring 28 is fitted at a specific distance from the lens holding cylinder 2. The two cam followers 2a, 28a that protrude from the lens holding cylinder 2 and the moving ring 28 pass through the guide groove 21c and then are connected to the cam grooves 24b and 24e respectively.

As shown in FIG. 2, a wave spring washer 23 is provided between the lens holding cylinder 2 and the moving ring 28 over the entire circumference. With this wave spring washer 23, a force is applied to the lens holding cylinder 2 in the forward direction and to the moving ring 28 in the backward direction. Therefore, the cam followers 2a, 28a are pressed against the wall surfaces of the cam grooves 24b and 24e respectively to eliminate play between the lens holding cylinder 2 and the moving ring 28 in the direction of the optical axis. As a result, no discrepancy is generated between the actual lens travel distance and the output of the detection of the encoder 7, and accurate lens travel distance can be detected, achieving an improvement in focusing accuracy.

Note that the members indicated with the numeral 21a, 21d, 21e, 24a, 24c, and 24d share the same functions as those members indicated with the numeral 1a, 1d, 1e, 4a, 4c, and 4d respectively in FIG. 8.

Next, the operation of this embodiment is explained.

The lens barrel that is structured as described above is mounted on the camera body (not shown). When the release button of the camera body is pressed halfway down, the focal point detection signal, which has been calculated in the focal point detection device of the camera body, is input to the CPU (not shown) within the lens barrel. The CPU drives and controls the focusing motor 6 in response to the input focal point detection signal and with this, the focusing operation is performed. The rotation of the focusing motor 6 is communicated to the cam cylinder 24 via a reduction gear train (not shown), the pinion gear 5 and the segment gear 24c to cause the cam cylinder 24 to rotate. With the rotation of the cam cylinder 24, the cam groove 24b drives the cam follower 2a along the guide groove 21c to cause the lens holding cylinder 2, i.e., the moving lens group L2, to move, relative to the fixed lens group L1, in the direction of the optical axis. When the lens travel distance as detected by the encoder 7 reaches the calculated lens travel distance, the CPU stops the focusing motor 6.

Meanwhile, with the rotation of the cam cylinder 24, the other cam groove 24e drives the cam follower 28a, and with the cam follower 28a traveling along the guide groove 21c, the moving ring 28 is driven in the direction of the optical axis. As shown in FIG. 2, since the cam groove 24e is identical to the cam groove 24b, and is formed to run parallel to the cam groove 24b, the moving ring 28 is driven in the same direction and at the same speed as the lens holding cylinder 2. In other words, even when the lens holding cylinder 2 moves during focusing, the distance between the lens holding cylinder 2 and the moving ring 28 remains constant. Therefore, the force applied by the wave spring washer 23, which is mounted between the lens holding cylinder 2 and the moving ring 28, remains constant regardless of where the lens holding cylinder 2 is positioned. Because of this, the friction torques among the various members constituting the lens barrel also remain constant. As a result, the distance traveled by the lens holding cylinder 2 from the time when the rotating focusing motor 6 is braked until the time when the lens holding cylinder 2 actually stops, that is, the stopping characteristics, can be maintained constant regardless of where the lenses are positioned to achieve an improvement in the focusing accuracy.

Especially in this embodiment, since the guide groove 21c is shared by the two cam followers 2a and 28a of the lens holding cylinder 2 and the moving ring 28, the machining of the fixed lens barrel small diameter section 21b is easy and also the structure offers good strength. Note that if it does not detract from the strength, separate guide grooves may be provided for the two cam followers 2a and 28a in the small diameter section 21b. Also, as the cam followers 2a, 28a are pressed against the surfaces of the cam grooves 24b, 24e in opposite directions with the force applied by the wave spring washer 23, linking the cam grooves 24b, 24e to integrate them into one groove will present no problem.

Second Embodiment

Figure 3:
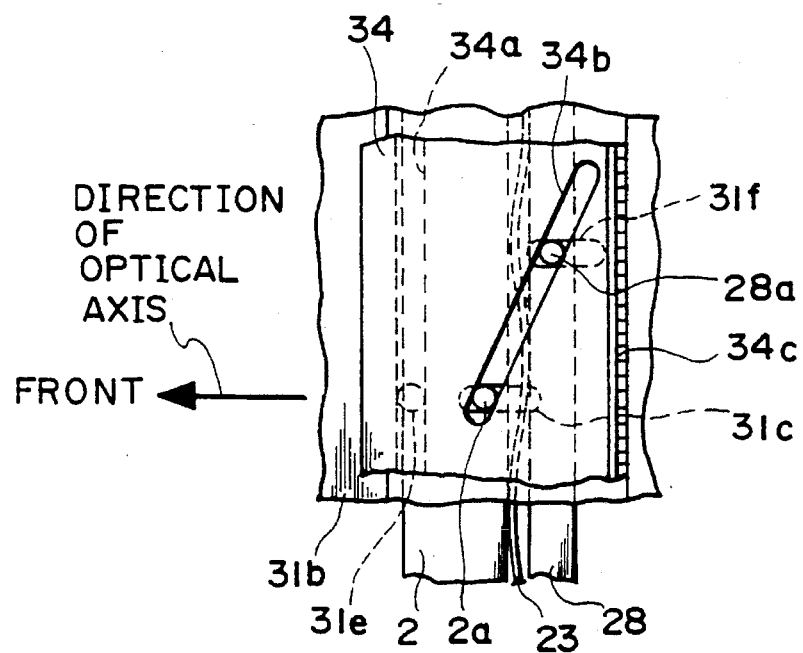
FIG. 3 is a cut-away elevation of the essential parts of the second embodiment of the lens barrel according to the present invention.

The second embodiment according to the present invention is explained in reference to FIG. 3. In FIG. 3, the same numeral are assigned to components identical to those shown in FIG. 2.

In the small diameter section 31b of the fixed lens barrel 31, a pair of guide grooves 31c, 31f extending in the direction of the optical axis are formed apart from each other in the direction of the circumference and a cam groove 34b is formed in the cam cylinder 34. The cam follower 2a, which protrudes from the lens holding cylinder 2 and the cam follower 28a which protrudes from the moving ring 28, pass through the guide grooves 31c and 31f respectively and fit into the cam groove 34b. Note that a numeral 34a indicates a fitting groove into which the pin 31e of the small diameter section 31b fits and the key number 34c is a gear into which the pinion gear 5 fits.

When the cam cylinder 34 rotates the cam groove 34b drives, the cam followers 2a, 28a move within the guide grooves 31c, 31e by means of the cam groove 34b to drive the lens holding cylinder 2 and the moving ring 28 in the direction of the optical axis. Since the cam groove 34b is straight, the lens holding cylinder 2 and the moving ring 28 move in the same direction and at the same speed, thus the force applied by the wave spring washer 23 is constant regardless of where the lenses are positioned. As a result, functions and effects similar to those achieved in the first embodiment are realized. Especially in this embodiment, since one cam groove 34b is shared by the cam followers 2a and 28a of the lens holding cylinder 2 and the moving ring 28 respectively, machining of the cam cylinder 34 is easier compared to that in the first embodiment and the structure of the cam cylinder 34 is also stronger. Furthermore, the length of the cam cylinder 34 in the direction of the optical axis can be reduced, making it possible to produce, more compact lens barrel.

Third Embodiment

Figure 4:
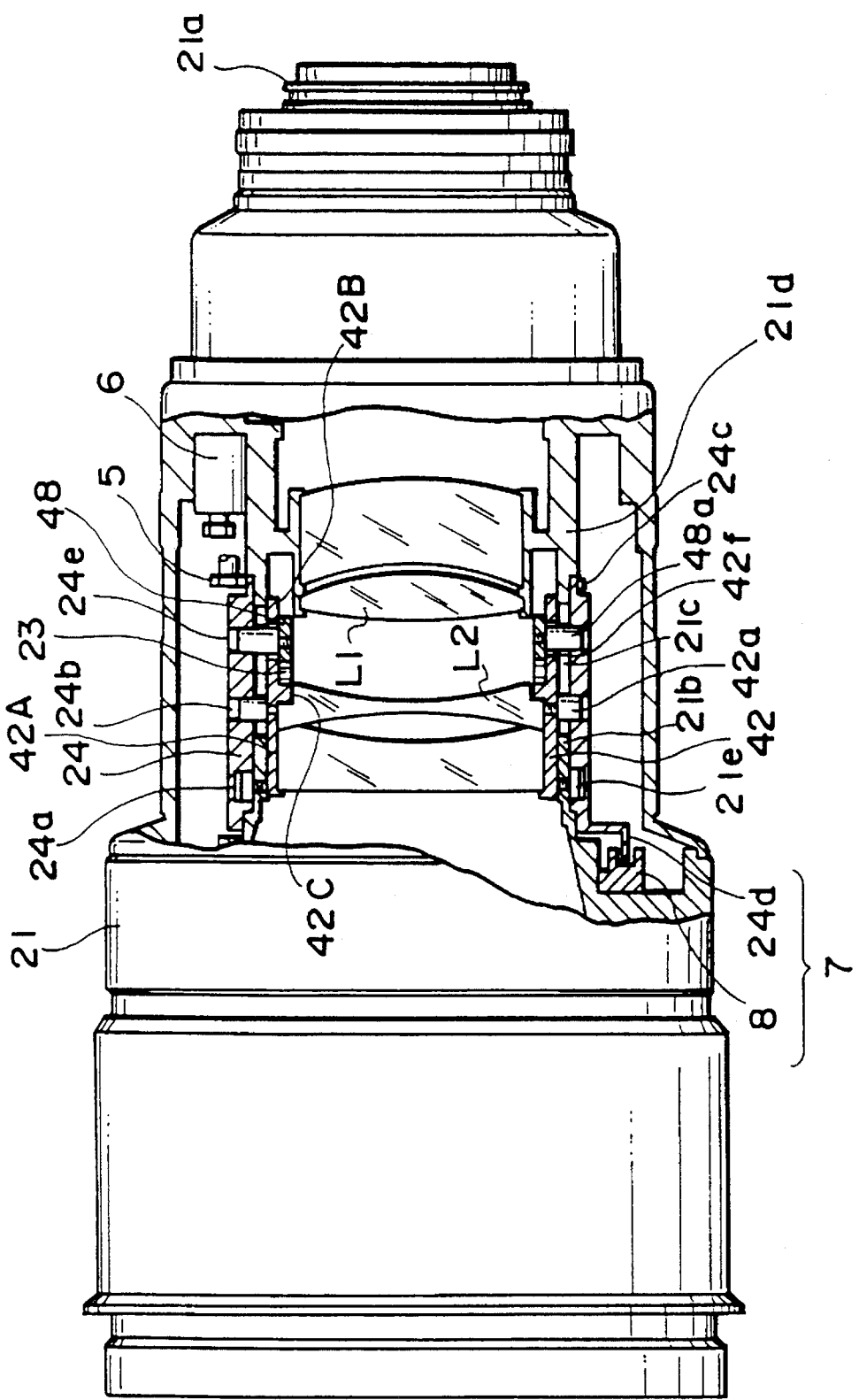
FIG. 4 is a cross section of the third embodiment of the lens barrel according to the present invention.
Figure 5:
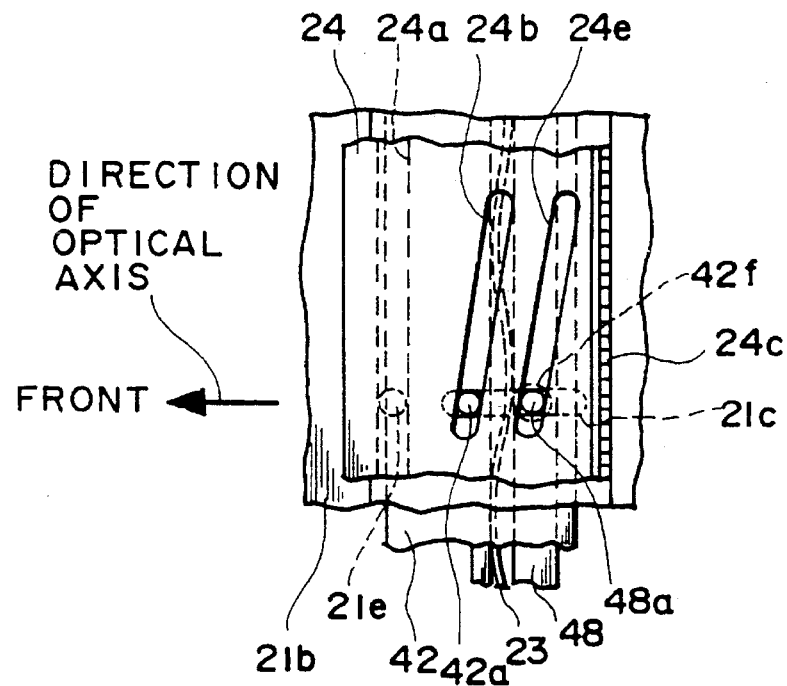
FIG. 5 is a cut-away elevation of the essential parts of FIG. 4.

FIGS. 4 and 5 show the third embodiment according to the present invention and the same numeral are assigned to components identical to those shown in FIGS. 1 and 2.

In this embodiment, the moving ring 48 is inserted through within the lens holding cylinder 42. The lens holding cylinder 42 is provided with the lens holding portion 42A and the moving ring fitting portion 42B which is linked in the rear of the lens holding portion 42A. The moving ring 48 is fitted into the fitting portion 42B in such a manner that it can move in the direction of the optical axis. On the internal circumferential surface at the boundary area between the lens holding section 42A and the fitting portion 42B, a flange 42C is formed, and a wave spring washer 23 is mounted between the flange 42C and the moving ring 48.

The cam follower 48a, which protrudes from the moving ring 48, passes through the through-hole 42f which is formed in the fitting portion 42B and the guide groove 21c of the fixed lens barrel small diameter section 21b and is fitted into the cam groove 24e of the cam cylinder 24. The cam follower 42a, which protrudes from the lens holding cylinder 42, passes through the guide groove 21c and then is fitted into the cam groove 24b of the cam cylinder 24. Therefore, the force applied by the wave spring washer 23 works in the forward direction on the lens holding cylinder 42 and in the rearward direction on the moving ring 48. As a result, the cam followers 42a, 48a are pressed against the wall surfaces of the cam grooves 24b and 24e respectively. This prevents any play between the lens holding cylinder 42 and the moving ring 48 in the direction of the optical axis and accurate lens travel distance can be detected with no discrepancy being generated between the actual lens travel distance and the output of the detection from the encoder 7.

When the cam cylinder 24 is rotated to perform focusing, the cam follower 42a is driven by the cam groove 24b and the lens holding cylinder 42 is driven in the direction of the optical axis. At this point, the cam follower 48 is driven by the cam groove 24e to drive the moving ring 48 in the same direction and at the same speed as the lens holding cylinder 42. As a result, the force applied by the wave spring washer 23 is maintained constant regardless of where the lenses are positioned and functions and effects similar to those achieved above are realized. Especially in this embodiment, since the moving ring 48 is inserted within the lens holding cylinder 42, the length of the lens holding cylinder 42 in the direction of the optical axis can be increased. As a result, the inclination of the central axis of the lens group L1 held by the lens holding cylinder 42 in relation to the direction of the optical axis can be reduced, achieving an improvement in optical performance.

Note that as the cam followers 42a, 48a are pressed against the surfaces of the cam grooves 24b, 24e in opposite directions with the force applied by the wave spring washer 23, linking the cam grooves 24b, 24e to integrate them into one groove will present no problem.

Fourth Embodiment

Figure 7:
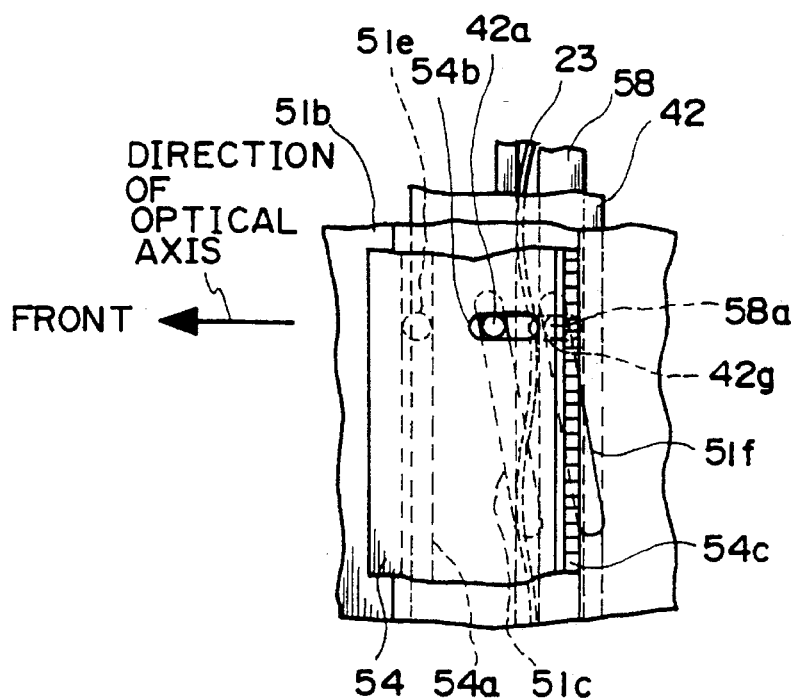
FIG. 7 is a cut-away elevation of the essential parts of FIG. 6.
Figure 6:
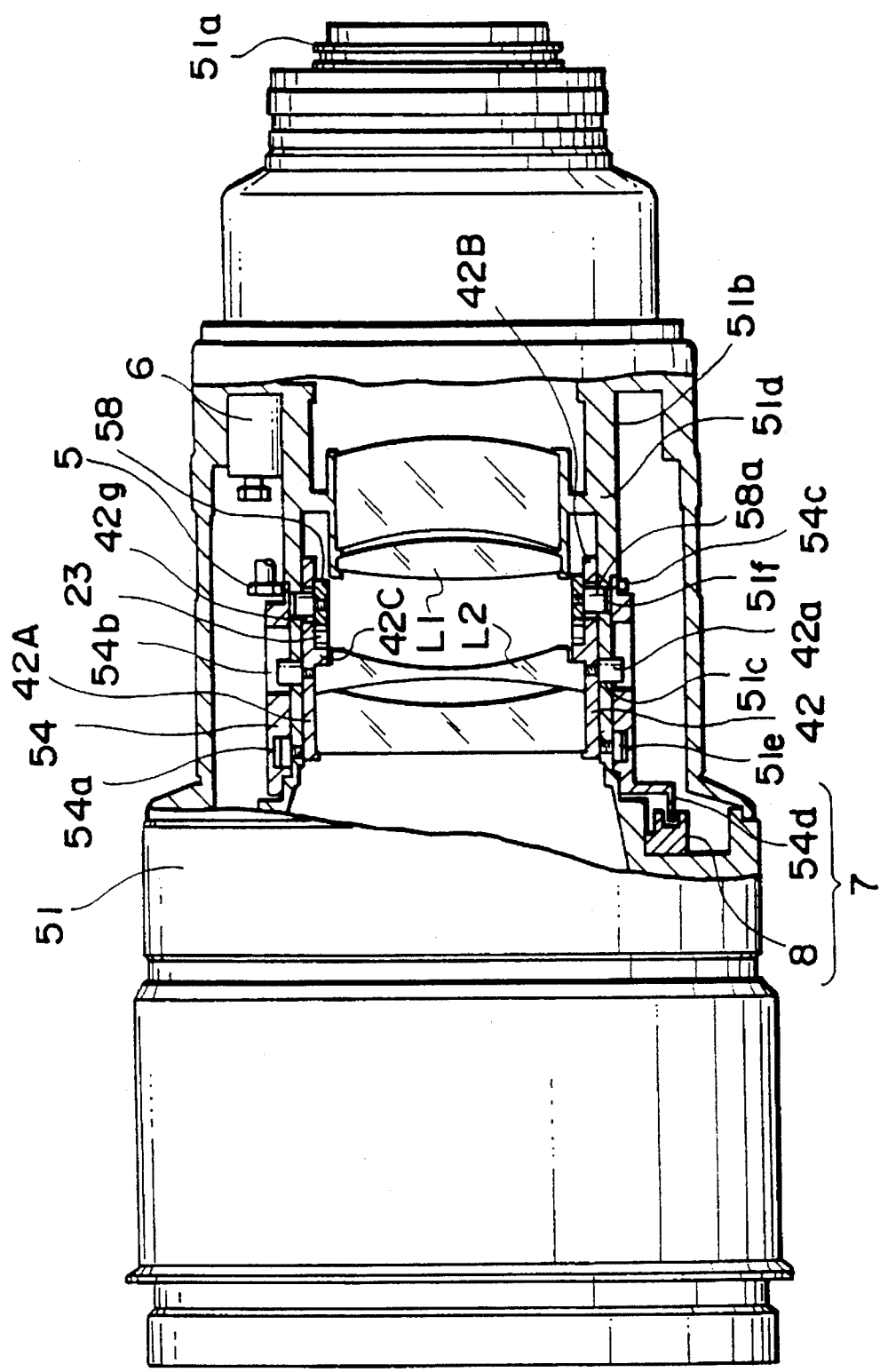
FIG. 6 is a cross section of the fourth embodiment of the lens barrel according to the present invention.

FIGS. 6 and 7 show the fourth embodiment according to the present invention and the same key numbers are assigned to components identical to those shown in FIGS. 4 and 5.

In the embodiments as described above, the guide grooves are provided in the fixed lens barrel small diameter section and the cam grooves are provided in the cam cylinder which is externally fitted on the fixed lens barrel. In this embodiment, the cam grooves 51c, 51f are provided in the small diameter section 51b and the rotating cylinder 54, which is provided with a guide groove 54b is externally fitted on the small diameter section 51b. The moving ring 58 passes through the inside of the lens holding cylinder 42 in this embodiment also.

The cam follower 42a, which protrudes from the lens holding cylinder 42, passes through the cam groove 51c, which is formed in the small diameter section 51b of the fixed lens barrel 51, and is then inserted in the guide groove 54b of the rotating cylinder 54. The cam follower 58a which is protrudes from the moving ring 58, passes through the guide groove 42g which is formed in the fitting portion 42B of the lens holding cylinder 42 to fit into the cam groove 51f of the small diameter section 51b. The two cam grooves 51c, 51f are formed identical to each other as shown in FIG. 7, and are positioned parallel to each other. Note that the members indicated with the numeral 51a, 51e, 54a, 54c and 54d share the same functions as those of the numeral indicated with the key numbers 21a, 21e, 24a, 24c, and 24d in FIG. 1 respectively.

When the rotating cylinder 54 is rotated by the focusing motor 6, the cam follower 42a travels through the cam groove 51c of the small diameter section 51b by the movement of the guide groove 54b. With this, the lens holding cylinder 42 is driven in the direction of the optical axis while rotating to perform focusing. In the meantime, when the guide groove 42g moves with the rotation of the lens holding cylinder 42, the moving ring 58 moves in the direction of the optical axis while rotating as the cam follower 58a travels inside the cam groove 51f of the small diameter section 51b. Since the cam grooves 51c, 51f are formed identical to each other and, positioned parallel to each other, the moving ring 58 moves in the same direction and at the same speed as the lens holding cylinder 42. As a result, the force applied by the wave spring washer 23 is maintained constant regardless of where the lenses are positioned, to realize functions and effects similar to those achieved above.

Also, in this embodiment, as in the third embodiment, since the moving ring 58 is inserted within the lens holding cylinder 42, the length of the lens holding cylinder 42 in the direction of the optical axis is increased. As a result, the inclination of the central axis of the lens group L1 in relation to the direction of the optical axis can be reduced achieving an improvement in optical performance. Furthermore, since the cam grooves 51c, 51f are provided in the fixed lens barrel small diameter section 51b, only the guide groove 54b has to be provided in the rotating cylinder 54, making it possible to further reduce the length of the rotating cylinder 54 compared to that of the second embodiment, thereby achieving an even more compact lens barrel.

Note that although in all the embodiments described above, the moving ring and the lens holding cylinder are driven in the same direction and at the same speed, they do not necessarily have to be driven at the same speed. That is, the moving ring may be made to travel at a speed slightly less than or greater than the speed at which the lens holding cylinder travels. With this structure too, the change in the force applied by the wave spring washer 23 can be kept low in comparison with the prior art, achieving an improvement in focusing accuracy. Also, the relative positions of the lens holding cylinder and the moving ring in the direction of the optical axis may be switched. Furthermore, while the embodiments present examples in which the moving ring functions merely as the spring receptacle, it may also be made that the moving ring functions as a lens holding member by making the moving ring hold the lens group on the internal circumferential surface. In addition, in the third and fourth embodiments, the moving ring is fitted inside the lens holding cylinder, but this may be reversed and the lens holding cylinder may be fitted inside the moving ring.

Moreover, in the embodiments described earlier, a linear type cam is used, but a curvilinear cam may also be used. Also, in the above embodiments, the present invention is applied to the focusing optical system, but it can be also applied to the zooming optical system. In that case, it becomes possible, for example, to move the zooming optical system to a preset focal length with high accuracy. It should also be noted that the means for applying force is not limited to the wave spring washer, and a coil spring, leaf spring, disk spring or the like may be used.

Furthermore, a mechanism for moving the moving ring in the direction of the optical axis is not restricted to a cam mechanism and the moving ring may, for example, be moved by a special motor via a gear train, or by the focusing motor or the zooming motor.

We claim:

1. A lens barrel comprising:

a rotating cylinder that rotates around an optical axis of a photographing lens, a lens holding member that holds said photographing lens, is engaged to the rotating cylinder and travels in a direction of the optical axis with the rotation of said rotating cylinder, a traveling member that travels in the same direction as said lens holding member with the rotation of said rotating cylinder, and a force applying mechanism that is provided between said traveling member and said lens holding member and which, in order to remove play in the direction of the optical axis between said lens holding member and said rotating cylinder, applies force to said lens holding member in the direction of said optical axis, wherein:

one of either said lens holding member or said traveling member is housed inside the other of said lens holding member and said traveling member.

2. A lens barrel according to claim 1 wherein:

a flange is formed on an internal circumferential surface of said lens holding member, said traveling member is housed within said lens holding member, and said force applying mechanism is provided between an end surface of said traveling member and an end surface of said flange which face opposite each other.

3. A lens barrel according to claim 2 wherein:

said force applying mechanism is a wave spring washer provided over an entire circumference of the end surface of said flange.

4. A lens barrel according to claim 1 further comprising:

a first drive mechanism between said lens holding member and said rotating cylinder and that moves said lens holding member in the direction of the optical axis with the rotation of said rotating cylinder, a second drive mechanism between said traveling member and said rotating cylinder and that moves said traveling member in a same direction as said lens holding member with the rotation of said rotating cylinder.

5. A lens barrel according to claim 4 wherein:

said traveling member is housed within said lens holding member, said first drive mechanism comprises:

a first cam groove that is provided in said rotating cylinder, a first guide groove that is provided in a fixed member in the direction of the optical axis to suppress the rotation of said lens holding member, and a first cam follower that protrudes from said lens holding member and which passes through said first guide groove to fit into said first cam groove, said second drive mechanism comprises:

a second cam groove that is provided in said rotating cylinder, a second guide groove that is provided in said fixed member in the direction of the optical axis to suppress the rotation of said traveling member, and a second cam follower that protrudes from said traveling member and which passes through a through-hole of said lens holding member and said second guide groove to fit into said second cam groove.

6. A lens barrel according to claim 5 wherein:

said first cam groove and said second cam groove are constituted of one straight cam groove.

7. A lens barrel according to claim 5 wherein:

said first guide groove and said second guide groove are constituted of a single groove.

8. A lens barrel according to claim 4 wherein:

said traveling member is housed within said lens holding member, said first drive mechanism comprises:

a first guide groove that is provided in said rotating cylinder in the direction of the optical axis to suppress the rotation of said lens holding member, a first cam groove that is provided in a fixed member, and a first cam follower that protrudes from said lens holding member and which passes through said first cam groove to fit into said first guide groove, said second drive mechanism comprises:

a second guide groove that is provided in said lens holding member in the direction of the optical axis to suppress the rotation of said traveling member, a second cam groove that is provided in said fixed member, and a second cam follower that protrudes from said traveling member and which passes through said second guide groove to fit into said second cam groove.

9. A lens barrel, comprising:

a rotating cylinder that rotates around an optical axis of a photographing lens;

a lens holding member that holds said photographing lens is engaged to said rotating cylinder and travels in a direction of the optical axis with rotation of said rotating cylinder;

a traveling member that moves in the same direction as said lens holding member and at substantially a same speed as said lens holding member with the rotation of said rotating cylinder; and a force applying mechanism that is provided between said traveling member and said lens holding member and which, in order to remove play in the direction of the optical axis between said lens holding member and said rotating cylinder, applies force to said lens holding member in the direction of said optical axis.

10. A lens barrel, comprising:

a rotating cylinder that rotates around an optical axis of a photographing lens;

a lens holding member that holds said photographing lens is engaged to said rotating cylinder and travels in a direction of the optical axis with rotation of said rotating cylinder;

a traveling member that moves in the same direction as said lens holding member with the rotation of said rotating cylinder; and a force applying mechanism that is provided between said traveling member and said lens holding member and which, in order to remove play in the direction of the optical axis between said lens holding member and said rotating cylinder, applies force to said lens holding member in the direction of said optical axis, wherein said traveling member comprises a cylindrical body which has substantially a same diameter as said lens holding member and which is also provided at a specific distance from said lens holding member in the direction of the optical axis, and said force applying mechanism is provided between an end surface of said traveling member and an end surface of said lens holding member which face opposite each other.

11. A lens barrel according to claim 10, wherein said force applying mechanism is a wave spring washer provided over almost an entire circumference of the end surface of said lens holding member.

12. A lens barrel, comprising:

a rotating cylinder that rotates around an optical axis of a photographing lens;

a lens holding member that holds said photographing lens;

a first drive mechanism between said lens holding member and said rotating cylinder to move said lens holding member in the direction of the optical axis by interlocking with the rotation of said rotating cylinder;

a traveling member movable in the direction of the optical axis;

a second drive mechanism between said travelling member and said rotating cylinder to move said traveling member in a same direction as said lens holding member and at substantially a same speed as said lens holding member with the rotation of said rotating cylinder; and a force applying mechanism that is provided between said traveling member and said lens holding member and which, in order to remove play in the direction of the optical axis between said lens holding member and said rotating cylinder, applies force to said lens holding member in the direction of said optical axis.

13. A lens barrel, comprising:

a rotating cylinder that rotates around an optical axis of a photographing lens;

a lens holding member that holds said photographing lens;

a first drive mechanism between said lens holding member and said rotating cylinder, which has a first cam groove that is provided in said rotating cylinder, a first guide groove that is provided in a fixed member in the direction of the optical axis to suppress the rotation of said lens holding member, and a first cam follower which protrudes from said lens holding member and which passes through said first guide groove to fit into said first cam groove, to move said lens holding member in the direction of the optical axis with the rotation of said rotating cylinder;

a traveling member movable in the direction of the optical axis;

a second drive mechanism between said travelling member and said rotating cylinder, which has a second cam groove that is provided in said rotating cylinder, a second guide groove that is provided in said fixed member in the direction of the optical axis to suppress the rotation of said traveling member, and a second cam follower that protrudes from said traveling member and which passes through said second guide groove to fit into said second cam groove, to move said traveling member in a same direction as said lens holding member with the rotation of said rotating cylinder; and a force applying mechanism that is provided between said traveling member and said lens holding member and which, in order to remove play in the direction of the optical axis between said lens holding member and said rotating cylinder, applies force to said lens holding member in the direction of said optical axis.

14. A lens barrel according to claim 13, wherein said first cam groove and said second cam groove are constituted of one straight cam groove.

15. A lens barrel according to claim 13, wherein said first guide groove and said second guide groove are constituted of a single groove.

16. A lens barrel, comprising:

a rotating cylinder that rotates around an optical axis of a photographing lens;

a lens holding member that holds said photographing lens is engaged to said rotating cylinder and travels in a direction of the optical axis with rotation of said rotating cylinder;

a traveling member that can travel in the direction of the optical axis;

an interlocking means for moving said traveling member in the same direction as said lens holding member and at substantially the same speed as said lens holding member with the rotation of said rotating cylinder; and a force applying mechanism that is provided between said traveling member and said lens holding member and which, in order to remove play in the direction of the optical axis between said lens holding member and said rotating cylinder, applies force to said lens holding member in the direction of said optical axis.

17. A lens barrel, comprising:

a rotating cylinder that rotates around an optical axis of a photographing lens;

a lens holding member that holds said photographing lens, is engaged to said rotating cylinder and travels in a direction of the optical axis with rotation of said rotating cylinder;

a traveling member that can travel in the direction of the optical axis;

an interlocking means for moving said traveling member in the same direction as said lens holding member with the rotation of said rotating cylinder; and a force applying mechanism that is provided between said traveling member and said lens holding member and which, in order to remove play in the direction of the optical axis between said lens holding member and said rotating cylinder, applies force to said lens holding member in the direction of said optical axis, wherein said traveling member comprises a cylindrical body which has substantially a same diameter as said lens holding member and which is also provided at a specific distance from said lens holding member in the direction of the optical axis; and said force applying mechanism is provided between an end surface of said traveling member and an end surface of said lens holding member which face opposite each other.

18. A lens barrel according to claim 17, wherein said force applying mechanism is a wave spring washer provided over almost the entire circumference of the end surface of said lens holding member.

* * * * *